J. POIRIER.
ROPE CLAMP.
APPLICATION FILED MAR. 1, 1915.
1,185,932.   Patented June 6, 1916.
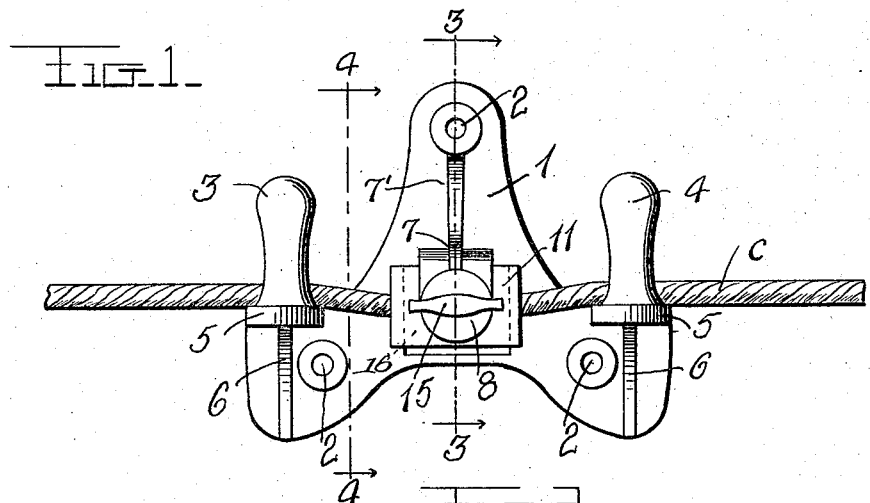
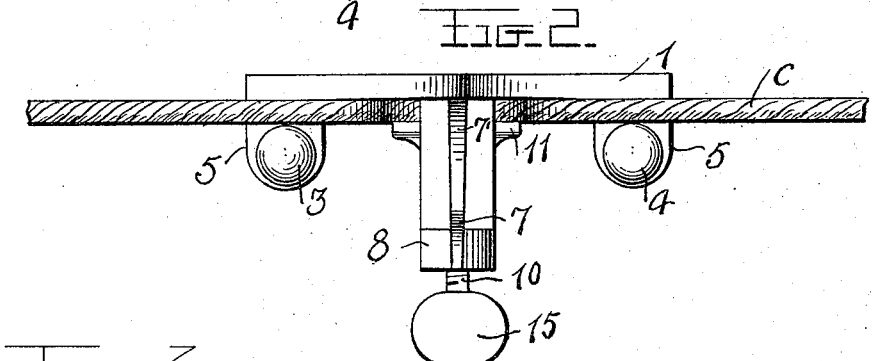
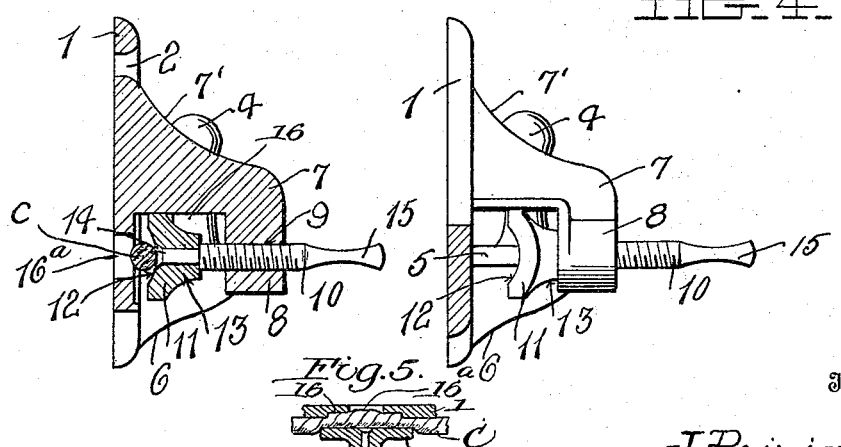
Witnesses
George W. Giovannetti
Inventor
J. Poirier.
By H. B. Willson & Co.
Attorneys

UNITED STATES PATENT OFFICE.

JOSEPH POIRIER, OF MINNEAPOLIS, MINNESOTA.

ROPE-CLAMP.

1,185,932.  Specification of Letters Patent.  Patented June 6, 1916.

Application filed March 1, 1915. Serial No. 11,224.

*To all whom it may concern:*

Be it known that I, JOSEPH POIRIER, a citizen of the United States, residing at Minneapolis, in the county of Hennepin and State of Minnesota, have invented certain new and useful Improvements in Rope-Clamps; and I do declare the following to be a full, clear, and exact description of the invention, such as will enable others skilled in the art to which it appertains to make and use the same.

This invention relates to improvements in rope clamps and more particularly to cable-grips.

The object of the invention is to provide a clamp or grip so constructed as to securely engage a cable and to permit its being quickly tightened to prevent it from slipping, and it may be used in connection with mining cars and other vehicles to be propelled by traveling, endless or other cable or in connection with a clothes line for supporting it intermediately of its ends as well as for supporting the ends thereof.

With these and other objects in view, the invention consists of certain novel features of construction, and the combination and arrangement of parts as will be more fully described and claimed.

In the accompanying drawing: Figure 1 represents a front elevation of this improved clamp applied; Fig. 2 is a plan view thereof; Fig. 3 is a central vertical section taken on the line 3—3 of Fig. 1, and Fig. 4 is a similar view taken on the line 4—4 of Fig. 1, with the clamp in open position. Fig. 5 is a detail horizontal section through the clamp, showing a rope or cable secured therein.

In the embodiment illustrated a supporting or attaching plate 1 is shown which may be of any suitable or desired shape, but it is here shown substantially triangular or A-shaped, with apertures 2 formed in the corners thereof for the passage therethrough of fastening elements for securing it to a support. This plate 1 is here shown in the form of a casting and the vertex thereof is designed to be disposed vertically with the other corners extending laterally in horizontal alinement and which are provided with upright knob-like cable guides 3 and 4, which are mounted on laterally extending integral lugs or brackets 5, so that said guides 3 and 4 are spaced from the plate 1 a sufficient distance to permit the cable C to pass freely between them and the outer face of said plate. These brackets 5 are shown provided with reinforcing webs 6, which are also preferably cast integral with the plate 1.

A bracket in the form of an L-shaped or right-angular arm 7 extends laterally from the front face of the plate 1 in a plane above the plane of the brackets 5, and is provided at its free end with a depending right angular bearing 8, having a threaded bore 9 therein extending parallel with the body of the bracket 7, and which is designed to receive a threaded shank 10 of the movable portion or jaw 11 of the clamp, as will be hereinafter further described. This bracket 7 has a straight flat inner face and is provided with a reinforcing web 7' on its upper face, which extends longitudinally thereof and is secured at its end to the base plate 1, being preferably made integral therewith. The movable jaw of this clamp or grip is here shown in the form of a substantially rectangular member, having its gripping face made slightly concave, as shown at 12 to adapt it to reliably engage and clamp a cable between it and the opposed outer face of the plate 1 without injuring or marring the cable. The upper edge of this jaw is slidably engaged with the straight flat inner face of the long arm of the member 7 and is thereby held against turning. This jaw is provided with a central boss or enlargement 13 on its outer face, and a bore 14 extends transversely therethrough, and in which is mounted the inner end of the shank 10, said jaw being swiveled on said shank, so that the shank may turn freely therein for moving the jaw toward and away from the base plate without turning the jaw. This shank, as above described, has a threaded engagement with the bore 9 of the bearing 8, and is provided at its outer end with a finger grip 15 to provide for the ready turning of the shank in said bearing to operate the movable jaw.

The front side of the base plate 1 is provided with a shallow flat-bottomed cavity 16 having an aperture 16ª, in its bottom and disposed opposite the movable jaw 11. The cavity and aperture are designed to receive the cable C, which is forced thereinto on the tightening of the clamping or movable jaw 11, so that said cable will be reliably held against longitudinal movement after once firmly gripped and compressed between said movable jaw and the portions of the base plate at the ends of the cavity. Obviously, the cable is also compressed between the jaw 11 and the bottom of the aforesaid cavity.

In the use of this device it is first secured to the support with which it is to be connected by passing suitable screws or other fastening elements through the apertures 2 in the base plate 1 and disposing it with the guides 3 and 4, and the vertex of the plate disposed upright. The jaw 11 is then moved away from the base plate 1 by turning the threaded shank thereof in the proper direction to provide ample space between it and said base plate for the passage of the cable C to be clamped. This cable is threaded between the guides 3 and 4 and the base plate 1 being passed under the bracket 7, thereby positioning it opposite the movable clamping jaw 11, which is then moved inward into gripping engagement with the cable by turning the shank 12 by means of the finger piece 15, and when said jaw 11 is tightly engaged with the cable, said cable will be forced laterally into the cavity and aperture 16 and 16ª respectively and gripped as above specified.

While the member 1 has been described as a base plate, it is obvious that it performs the double function of a base or supporting plate and of the fixed jaw of the clamp, and coöperates with the movable jaw for securing the cable between them.

I claim as my invention:

A line clamp comprising an attaching plate, an arm formed integrally with and extending from said plate midway between its side edges, a lug extending from and formed integrally with the free end of said arm, said lug having a screw threaded opening, a clamping screw in said opening and having on its rear end a clamping plate coöperating with the attaching plate to grip a line, a pair of line supporting ears formed integrally with and projecting forwardly from the plate, said ears being spaced equal distances to the right and left of the screw, and a pair of posts extending from and formed integrally with the front ends of said ears to prevent sliding of the line therefrom.

In testimony whereof I have hereunto set my hand in presence of two subscribing witnesses.

JOSEPH POIRIER.

Witnesses:
Geo. E. Young,
A. D. Bennett.